Feb. 16, 1960  C. J. KOONS ET AL  2,925,299
CABLE SLING COUPLING
Original Filed April 19, 1956  2 Sheets-Sheet 1
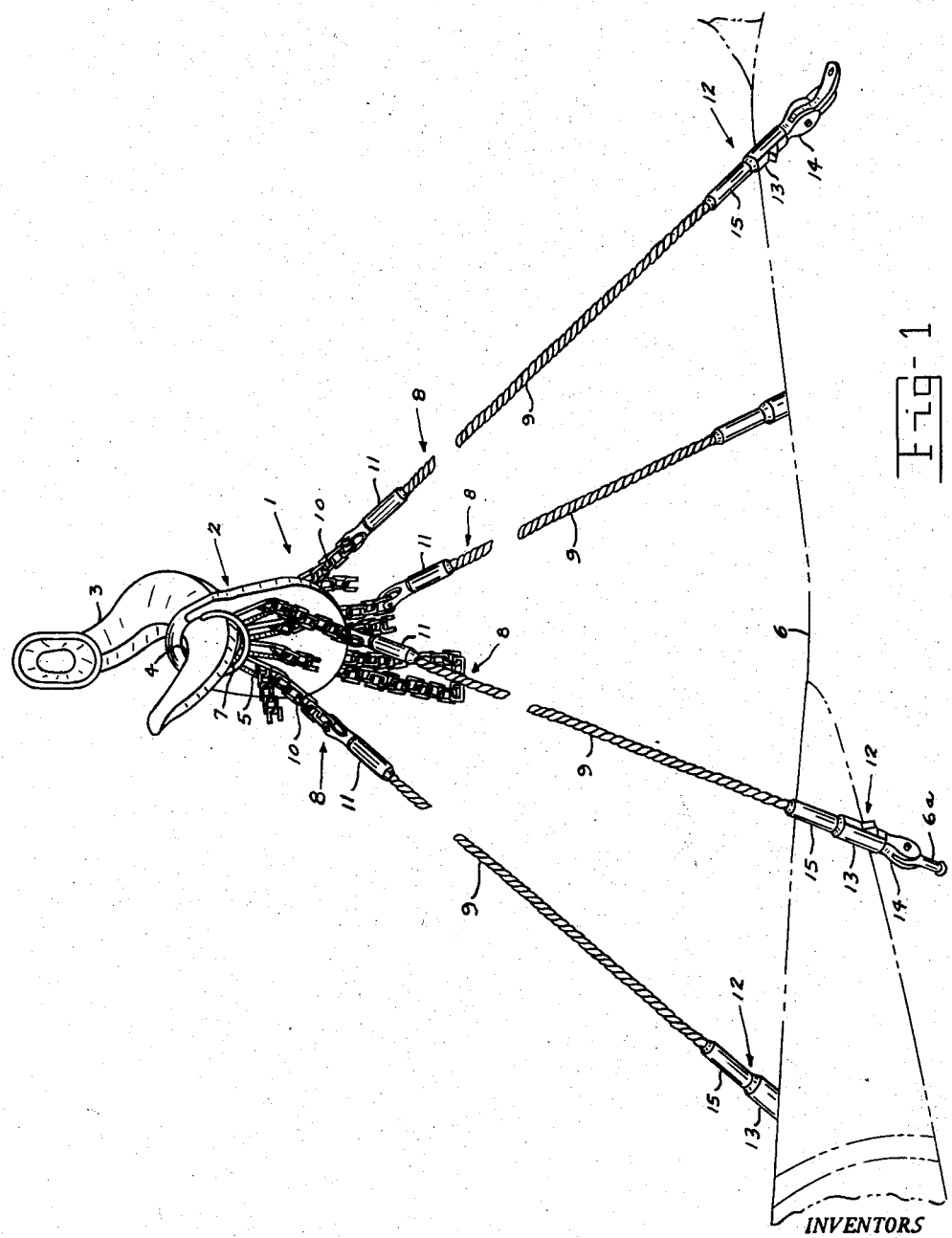
INVENTORS
GERALD D. ARCHDEACON
CLARENCE J. KOONS
BY
ATTORNEYS

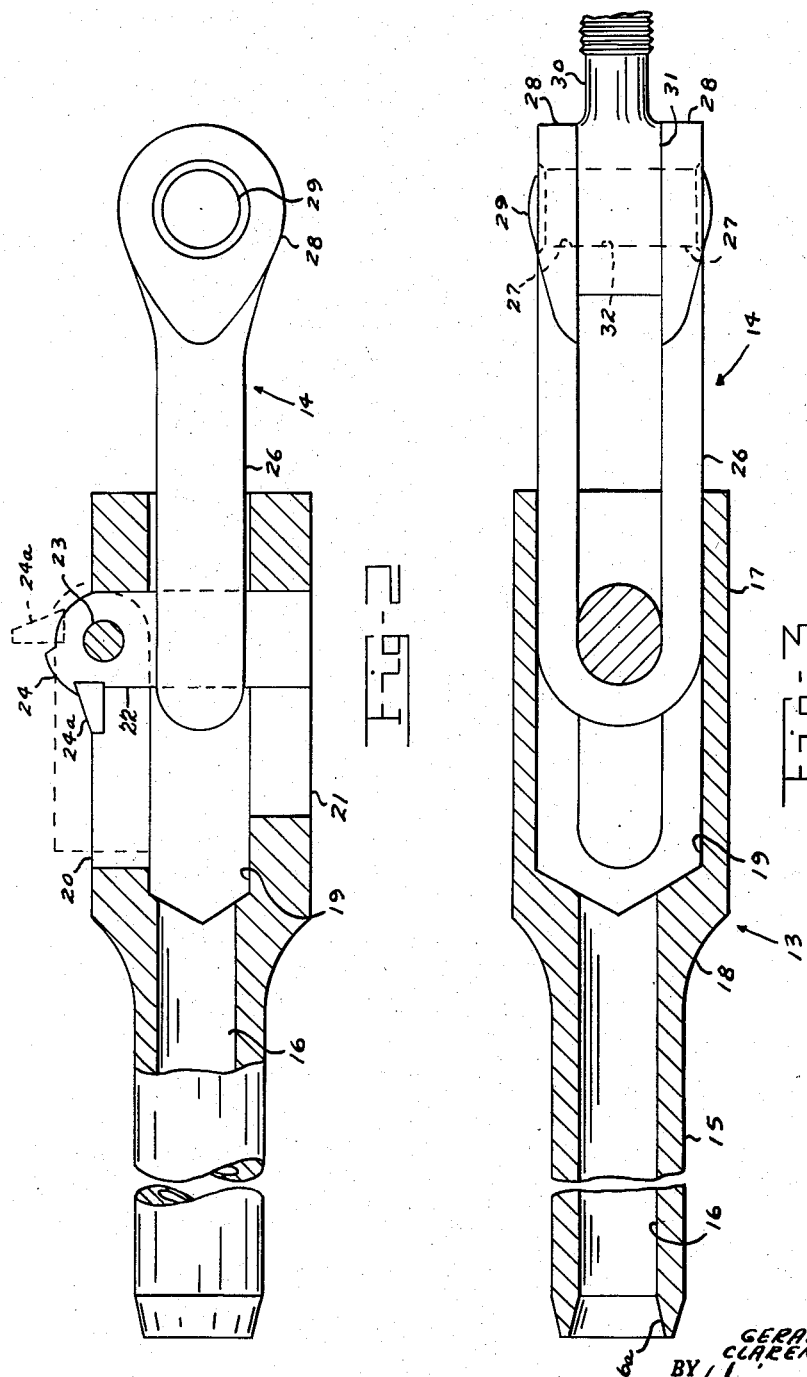

ated Feb. 16, 1960

2,925,299
CABLE SLING COUPLING

Clarence J. Koons, Columbia, Pa., and Gerald D. Archdeacon, Fairborn, Ohio, assignors to the United States of America as represented by the Secretary of the Air Force Original application April 19, 1956, Serial No. 579,414, now Patent No. 2,820,661, dated January 21, 1958. Divided and this application January 14, 1957, Serial No. 634,130

4 Claims. (Cl. 294—78)

(Granted under Title 35, U.S. Code (1952), sec. 266)

The invention described herein may be manufactured and used by or for the United States Government for governmental purposes without payment to us of any royalty thereon.

This application is a division of application Serial Number 579,414, filed April 19, 1956, and issued January 21, 1958 as Patent No. 2,820,661, and relates to a heavy duty coupling or securing means to effect the rapid, secure attachment of the pendent members of a sling or the like to a load to be lifted and which can further be easily and rapidly detached at the end of each lifting operation.

The present invention is designed to replace the presently existing diverse types of attachments for the interconnection between a lift sling and load. An example of the problem presents itself in the cargo loading of aircraft where it has been common to utilize a different type of connection means between the sling and load in accordance with the variations in configuration and weight of the aircraft or load to be lifted. For instance, in cable sling arrangements a different coupling device has been necessary for each of the connection points on the aircraft, such as, eyebolts in the tail section, bracket supports on the wing, and a strap lift around the nose portion.

Another disadvantage of the presently existing coupling members is the amount of time necessary to secure the coupling to the load, such as in the use of threaded members. An additional drawback is the lack of provision for a standard type coupling means which is compact, yet capable of being used in lightweight and heavy duty work so as to permit the use of universal type sling arrangements without the necessity of interchanging cables or coupling members for various configurations and weights of loads to be lifted.

Accordingly, it is the primary object of the present invention to provide a heavy duty, compact coupling arrangement which can be standardized for interconnection between a universal type sling arrangement and a variety of weights and sizes of loads.

It is another object to provide a heavy duty, compact load fastener which may be securely attached for each lifting operation, further secure against release when unloaded, yet is rapidly detachable from the load and attachable for each succeeding lifting operation.

It is another object to provide a heavy duty, universal type load fastener including a male fitting for permanent attachment to the loads to be lifted and a unique female fitting secured to each cable sling for the rapid, permanent interconnection of each cable and the load.

It is a still further object to provide a heavy duty, universal type load fastener for the rapid attachment and detachment between a cable sling and load to be lifted which is secured in attached position against accidental release.

With the above mentioned and other objects in view, the invention consists primarily in the provision of a U-shaped shackle member which is pivotally connected at its free ends to the flange portion of the attachment fittings of the aircraft, and a socket inclosure assembly secured to the lower end of each of the cables of a lift sling or the like, the socket assembly having an insert portion for placement of the closed end of the shackle within the socket inclosure and a latch arrangement secured to the socket to permanently lock the shackle against release from the socket. The invention further includes the novel parts and combination and arrangement of parts as hereinafter more particularly described and claimed.

Fig. 1 is a perspective view of a typical sling arrangement and the use of the load fastener or couplings of the present invention for attachment of the sling to the fuselage of an aircraft.

Fig. 2 is a detailed longitudinal sectional view of the socket and shackle assembly comprising the coupling means.

Fig. 3 is a longitudinal sectional plan view taken on a plane perpendicular to Fig. 2 of the socket assembly shown in Fig. 2 with the latch arrangement in unlatched and latched positions.

Referring more particularly to the drawings there is shown in Fig. 1 a universal sling arrangement 1 which is more particularly described in our copending application, Serial Number 579,414, filed April 19, 1956, and issued January 21, 1958 as Patent No. 2,820,661, and which is comprised broadly of a main gather link or lifting ring 2 suspended from a standard crane hook 3 which is attached to a crane or hoist mechanism (not shown). Extending radially outwardly from the ring opening of the guide link 2 are a plurality of chain slots 5 for the insertion of pendent cable-chain members 8, each of the cable-chain members 8 being provided with a chain length 10 attached by means of a coupling 11 to the upper end of a cable 9. To retain each of the chains in attached position within the slots, a retainer plate 7 is assembled for rotatable movement on the ring opening to close the open ends of the chain slots 5.

The invention consists essentially in a coupling means or load fasteners 12 provided for the interconnection of each cable 9 and an aircraft 6 or load to be lifted by the crane mechanism. The coupling means 12 is made up broadly of a socket assembly 13 secured to the cable 9 and a shackle member 14 secured to an attachment fitting 6a on the aircraft 6.

As shown in Figs. 2 and 3, each socket assembly consists of an upper tubular or cylindrical portion 15 having a bore portion 16 extending axially therethrough with an outwardly flared portion 16a at the upper end thereof. The lower end of each cable 9 is secured within the bore 16 by a swaging or other suitable securing operation, the outwardly flared portion 16a acting to prevent sharp bending of the cable during the lifting operation.

The socket assembly 13 further includes a lower, enlarged cylindrical portion or thimble 17 integrally joined with the upper cylindrical portion 15 by means of an outwardly tapered portion 18. The lower portion 17 is provided with a socket or pocket 19 of oblong, slotted cross section extending axially the length of the portion 17 and converging at its inner extremity into the bore 16. Positioned on diametrically opposed sides of the lower portion 17 and extending transversely through the wall of the lower portion in communication with the sides of the pocket 19 are slotted sections 20 and 21. A latch or locking bar 22 is pivotally attached to the sides of the slot 20 adjacent the lower end thereof by means of a pin 23 fixed across the slot portion. The bar 22 is of a length sufficient to swing across the pocket 19 and into opposite slot 21 with its outer edge positioned across the lower end of the slot as shown in Fig. 2. In this horizontal position across the pocket the latch bar is of a sufficient thickness at its pivotal end in slot 20 so that the lower edge of the latch will be resting against the lower end of the slot 20. The latch 22 is further provided with a limit stop or catch 24 provided on the outside of its attached end to limit the return swing of the latch by abutting the lower edge of the slot 20 thereby disposing the latch 22 in a substantially vertical position within the slot. Positioned adjacent the limit stop 24 is a lever 24a to swing the latch back and forth.

The shackle member 14 is also shown in Figs. 2 and 3 having a U-shaped tongue portion 26 and oval shaped free end portions 28 at the extremities of the shackle arms. The shackle 14 is preferably connected to suitable attachment fittings 30 including flange 31 by placement of the flange 31 between the free end portions 28. Both the free end portions and the flange 31 are provided with mating bore portions 27 and 32 respectively for the insertion of a shackle pin 29 therethrough to permit pivotal or swivelled movement of the shackle 14 about the flange 31.

The shackle member 14 may be easily and rapidly inserted, and locked within each socket assembly 13 by lowering the pocket 19 over the outer, closed end of the tongue 26, the pocket 19 being formed of a slotted cross section slightly greater than the width and thickness of the tongue 26 to insure proper alignment of the tongue with the latch member 22. The closed end of the tongue, as it is passed upwardly into the pocket, will force the latch bar 22 out of the pocket and into a substantially upright position in the slot 20, as shown in Fig. 2. As the shackle passes the end of the bar 22, the bar will fall back or may be manually pivoted to swing between the shackle arms and into the slot 21.

In lifting the aircraft, each shackle 14 will then be restrained against release by the interpositioned bar 22. As noted, the bar is disposed in a supported position against the lower edge of the slot 21 so that very little strain is taken by the latch pin 23, and also the load is distributed more evenly throughout the socket assembly. Also, the shackle 14 will permit shifting of the aircraft without imposing undue binding stresses on the cables, and the outwardly flared portion 16a will prevent sharp bending of the cable during the lifting operation.

Upon completion of the lifting operation, the coupling member 12 is disconnected by forcing the shackle 14 upwardly past the slot 20 and swinging the latch back through the shackle opening by means of the lever 24a. The shackle may then be withdrawn from the socket and the socket is then ready for the next lifting operations.

Although the socket and shackle coupling arrangement has been described for use in cable type sling arrangements, it could also be made conformable for use with other types of lifting means, such as chains, or for operations other than hoisting simply by modifying the upper cylindrical portion 15. However, it will be apparent that many other changes and modifications in the arrangement and construction of the parts thereof may be resorted to without departing from the true spirit and scope of the invention.

What is claimed:

1. In a universal sling arrangement having a plurality of cable-chain members adapted for suspension from a crane apparatus, a plurality of coupling means releasably interconnecting each cable-chain member to a load to be hoisted, each of said coupling means comprising a U-shaped shackle member having a U-shaped tongue portion incorporating a closed inner end and a pair of parallel shackle arms integrally formed therewith and terminating in a pair of open end portions at the end thereof remote from said closed inner end in hinged connection with attachment fittings provided for said load, an elongated socket assembly having an upper cylindrical portion provided with an outwardly flared bore extending axially therethrough for connection to a respective cable-chain member and an enlarged lower cylindrical portion incorporating a slotted socket axially aligned with the upper cylindrical portion for receiving the tongue portion of said shackle member and a pair of diametrically opposed slotted sections extending transversely through the walls of the lower cylindrical portion in communication with the sides of the socket, and latch means pivotally disposed in one of said slotted sections to initially swing upwardly to an inoperative position therein upon passage of said tongue portion into said socket and to subsequently swing downwardly between said pair of shackle arms into continuous supporting contact against the lower edge of the other of said slotted sections to positively lock said shackle and the load connected therewith within the socket of the lower cylindrical portion of said socket assembly.

2. In a universal sling, a coupling arrangement for attachment of a cable to a load to be lifted comprising an elongated socket assembly having an upper relatively narrow cylindrical portion having an axially extending bore for insertion and connection thereinto of a cable, an enlarged lower cylindrical portion having an enlarged end opening and incorporating an inner relatively elongated pocket extending axially therethrough into said bore terminating adjacent the inner end of said upper portion and having opposite longitudinally slotted portions extending transversely through opposite side walls thereof terminating at their inner ends in spaced relation to the inner end of said upper relatively narrow cylindrical portion, and a latch member pivotally attached between the sides of one of said slotted portions at the lower end thereof for pivotal movement through said pocket and across said opposite slotted portion in supporting engagement on the lower edge thereof when in the latched position, and a U-shaped shackle member having a U-shaped portion forming a pair of shackle arms incorporating a closed end portion for slidable insertion in the enlarged end opening and said pocket and engageable with said latch member to positively lock said shackle member thereto when said latch member has pivoted into said opposite slotted portion, and a pair of free end portions spaced apart for pivotal connection to an attachment fitting adapted for attachment to the load to be lifted.

3. In a universal sling having a plurality of cable members adapted for suspension from a crane apparatus or the like, a plurality of coupling means to releasably interconnect each cable and a load to be lifted, each of said coupling means comprising a substantially U-shaped shackle having shackle arms incorporating an integral closed end and an open end in hinged connection to the load, a socket assembly having means at the upper end thereof for attachment to a respective cable and a lower cylindrical portion having a shackle receiving relatively elongated, pocket extending upwardly into said cylindrical portion of oblong cross section to receive the integral closed end of said shackle and retain said shackle in predetermined position within said pocket, and diametrically opposed longitudinal slots passing transversely through the wall of said lower cylindrical portion to communicate with the sides of said pocket, a latch member mounted at one end between the sides of one of said longitudinal slots for initial swinging movement upwardly upon passage of the closed end of said shackle into the pocket and for subsequent downward swinging movement between said shackle arms rearwardly of and in contact with said closed end of said shackle into said opposite slot in substantial abutting engagement with the lower end of said slot to restrain said shackle against release, a control lever member connected to the pivotal end of said latch member to return said latch member to an upward position for rapid release of said latch, and stop means on said latch member adjacent its pivot point limiting the return of said latch member to a predetermined upward position.

4. In a universal sling arrangement, a plurality of pendent cable members adapted for engagement to a main hoist device, and means coupling said cable members to a load to be lifted comprising a socket assembly secured to each of said cable members, a shackle member adapted for attachment to the load to be lifted, and means interconnecting said socket assembly and said shackle member, each of said socket assemblies consisting of an upper relatively narrow cylindrical portion having an axially extending bore terminating in an outwardly flared, relatively narrow upper end opening and adapted for securing the lower end of a respective cable member therein, a lower relatively enlarged cylindrical portion having a pair of diametrically opposed, transversely extending slotted side portions and terminating in an enlarged lower end opening, a relatively elongated, recessed socket portion incorporated within said lower portion having a pair of diametrically opposed slotted side portions in communication with the slotted side portions of said lower portion, and an outwardly tapered intermediate portion integrally joining said upper and lower portions, each of said shackle members consisting of an elongated tongue portion at one end thereof extending into said enlarged lower end opening in engagement with a relatively elongated flange portion of spaced shackle arms terminating in a pair of open free end portions at the other end thereof each incorporating a transversely disposed bore portion for mating engagement with a relatively elongated flange portion of an attachment fitting positioned therebetween and adapted to be secured to the load to be lifted, said interconnecting means comprising a mounting pin affixed between opposite interior side walls of the lower portion of said socket assembly adjacent and transverse to one of said diametrically opposed slotted side portions, a latch member pivotally positioned on said mounting pin for swinging movement across said recessed socket portion between an upper unlatched position extending across one of said slotted side portions and a lower latched position extending into the other of said slotted side portions at right angles to said unlatched position in substantially continuous supporting contact on the lower edge of said last-named slotted side portion and engaged between said pair of shackle arms in positive locking position against said tongue portion when said shackle member is in mounted condition with said socket assembly, and a limit stop member incorporated on said latch member adjacent its pivot on said mounting pin in periodic abutting engagement with the lower edge of said first-named slotted side portion to limit the return swing of said latch member to its unlatched position.

References Cited in the file of this patent
UNITED STATES PATENTS

| | | |
|---|---|---|
| 1,741,463 | Hickok | Dec. 31, 1929 |
| 1,882,167 | Thirlwell | Oct. 11, 1932 |
| 2,414,725 | Dunn | Jan. 21, 1947 |
| 2,676,834 | Grazier | Apr. 27, 1954 |
| 2,721,757 | Anderson | Oct. 25, 1955 |
| 2,820,661 | Koons et al. | Jan. 21, 1958 |

FOREIGN PATENTS

| | | |
|---|---|---|
| 1,067,746 | France | Jan. 27, 1954 |

UNITED STATES PATENT OFFICE
CERTIFICATE OF CORRECTION

Patent No. 2,925,299 February 16, 1960

Clarence J. Koons et al.

It is hereby certified that error appears in the printed specification of the above numbered patent requiring correction and that the said Letters Patent should read as corrected below.

Column 5, line 27, for "with a relatively elongated flange portion of" read -- in said socket portion and a pair of parallel, --.

Signed and sealed this 20th day of September 1960.

(SEAL)
Attest:
KARL H. AXLINE
Attesting Officer

ROBERT C. WATSON
Commissioner of Patents